(12) United States Patent
Yan

(10) Patent No.: US 12,529,581 B2
(45) Date of Patent: Jan. 20, 2026

(54) ROTARY ENCODER CALIBRATION

(71) Applicant: GM CRUISE HOLDINGS LLC, San Francisco, CA (US)

(72) Inventor: Zhizhong Yan, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 1064 days.

(21) Appl. No.: 17/559,604

(22) Filed: Dec. 22, 2021

(65) Prior Publication Data

US 2023/0194315 A1 Jun. 22, 2023

(51) Int. Cl.
*G01D 18/00* (2006.01)
*G01D 5/347* (2006.01)
*G01S 7/497* (2006.01)
*G01S 17/931* (2020.01)

(52) U.S. Cl.
CPC ......... *G01D 18/001* (2021.05); *G01D 5/3473* (2013.01); *G01S 7/497* (2013.01); *G01S 17/931* (2020.01)

(58) Field of Classification Search
CPC .... G01D 18/001; G01D 5/3473; G01S 7/497; G01S 17/931
See application file for complete search history.

(56) References Cited

U.S. PATENT DOCUMENTS

| 5,418,362 A * | 5/1995 | Lusby | ................ G01D 5/34792 |
| | | | 250/237 G |
| 8,466,672 B2 * | 6/2013 | Dixon | .................. G01D 18/001 |
| | | | 360/79 |
| 11,774,983 B1 * | 10/2023 | Zhang | .................. G05D 1/0253 |
| | | | 701/28 |

FOREIGN PATENT DOCUMENTS

JP 2008070802 A * 3/2008

OTHER PUBLICATIONS

Graetz, "On-axis Self-calibration of Angle Measurement Errors in Precision Rotary", 2011, UBC Publication, pp. 1-139 (Year: 2011).*
Katsuki et al., "Development of High Efficiency and High Reliable Glass Cleaning Robot with Dirt Detector Sensor", 2011, IEEE Publication, pp. 5133-5138 (Year: 2011).*
English translation of JP-2008070802-A (Year: 2008).*

* cited by examiner

*Primary Examiner* — Elias Desta
(74) *Attorney, Agent, or Firm* — Honigman LLP; Matthew H. Szalach; Jonathan P. O'Brien

(57) ABSTRACT

The subject disclosure relates to techniques for determining a positioning error of a rotary encoder. A process of the disclosed technology can include steps of receiving measurement data including an angle and timestamp measured at each of a plurality of positions during a rotation of a rotary encoder, determining an angular velocity, at each of the plurality of positions, based on the corresponding measurement data, and determining a positioning error of the rotary encoder based on the angular velocity at each of the plurality of positions. Systems and machine-readable media are also provided.

14 Claims, 5 Drawing Sheets

ROTARY ENCODER CALIBRATION

TECHNICAL FIELD

The subject matter of this disclosure relates in general to the field of a control and sensor system, and more particularly, to solutions for determining a positioning error of a rotary encoder for a rotary encoder calibration.

BACKGROUND

Autonomous vehicles (AVs) are vehicles having computers and control systems that perform driving and navigation tasks that are conventionally performed by a human driver. As AV technologies continue to advance, a real-world simulation for AV testing has been critical in improving the safety and efficiency of AV driving. An exemplary AV can include various sensors, such as a camera sensor, a Light Detection and Ranging (LiDAR) sensor, and a Radio Detection and Ranging (RADAR) sensor, among others.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

SUMMARY

Figure 1B:
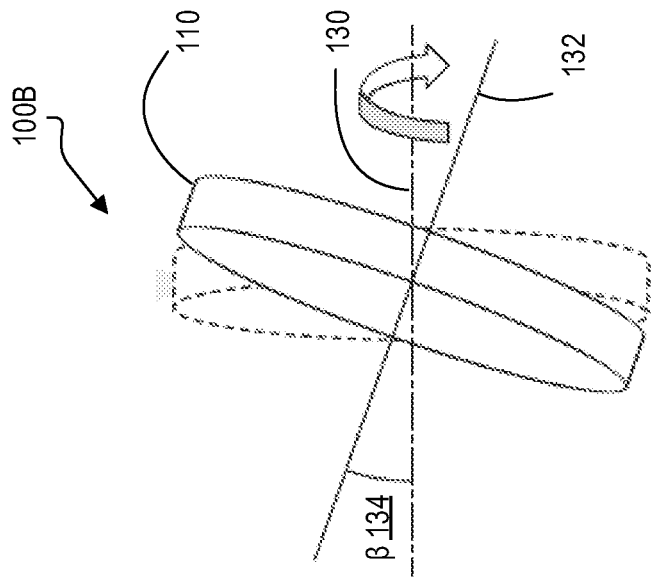
FIGS. 1A and 1B illustrate example positioning errors of a rotary encoder according to some aspects of the disclosed technology.

Disclosed are systems, apparatuses, methods, computer-readable medium, and circuits for determining a positioning error of a rotary encoder. According to at least one example, a method includes receiving measurement data including an angle and timestamp measured at each of a plurality of positions during a rotation of a rotary encoder, determining an angular velocity, at each of the plurality of positions, based on the corresponding measurement data, and determining a positioning error of the rotary encoder based on the angular velocity at each of the plurality of positions.

In another example, a system for determining a positioning error of a rotary encoder includes a rotary encoder, a storage (e.g., a memory configured to store data, such as virtual content data, one or more images, etc.), and one or more processors (e.g., implemented in circuitry) coupled to the memory and the rotary encoder and configured to execute instructions and, in conjunction with various components (e.g., a network interface, a display, an output device, etc.), cause the system to receive measurement data including an angle and timestamp measured at each of a plurality of positions during a rotation of the rotary encoder, determine an angular velocity, at each of the plurality of positions, based on the corresponding measurement data, and determine a positioning error of the rotary encoder based on the angular velocity at each of the plurality of positions.

A non-transitory computer-readable storage medium having stored therein instructions which, when executed by one or more processors, can cause the one or more processors to receive measurement data including an angle and timestamp measured at each of a plurality of positions during a rotation of the rotary encoder, determine an angular velocity, at each of the plurality of positions, based on the corresponding measurement data, and determine a positioning error of the rotary encoder based on the angular velocity at each of the plurality of positions.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A rotary encoder, also called a shaft encoder is a type of position sensor that converts the angular position or motion of a shaft or axle to output signals. For example, a rotary encoder measures the azimuth angle of the lidar as it spins so that the rotary encoder may determine the pointing direction (i.e., angular position) of the lidar system with respect to a fixed reference. However, due to manufacturing inconsistencies (e.g., eccentricity error in the encoder or a tilted encoder), the rotary encoder may not accurately measure the azimuth of the rotor of the lidar and may result in inaccurate lidar data. Therefore, the design and mounting of the rotary encoder have a significant impact on sensor data accuracy.

Aspects of the disclosed technology address the foregoing limitations of a conventional method of rotary encoder calibration without having to change any rotary encoder setup. In some implementations, some aspects of the disclosed technology provide a sensor calibration mechanism that can correct sensor data and provide a more accurate point cloud.

DESCRIPTION

Figure 1A:
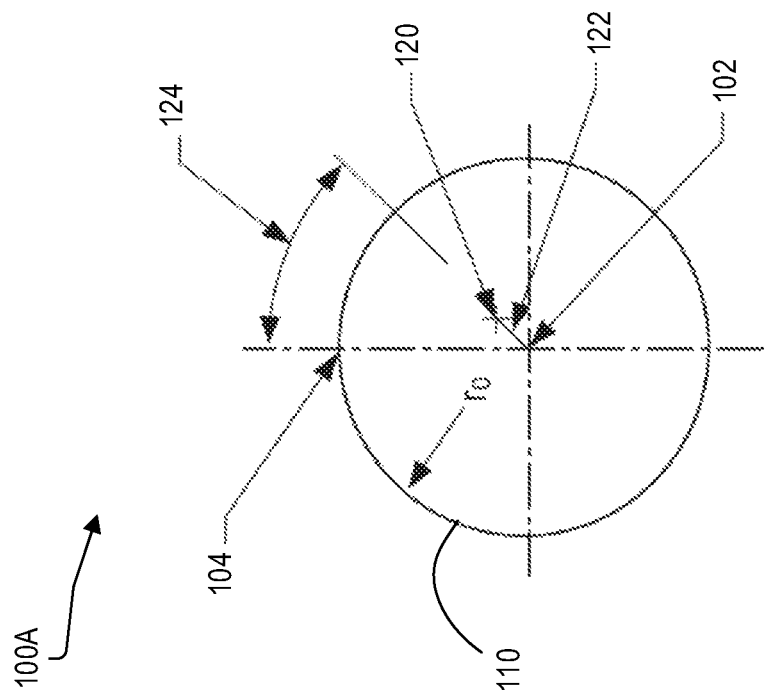

FIGS. 1A and 1B illustrate positioning errors 100A and 100B of a rotary encoder 110. In FIG. 1A, eccentricity error 100A of rotary encoder 110 is illustrated. In some examples, eccentricity error 100A can occur when the center of rotation 120 is displaced from the geometry center 102 of rotary encoder 110. For example, center of rotation 120 is off-centered from geometry center 102 of rotary encoder 110, which leads to phase angle $\phi_1$ 124 from nominal zero azimuth 104. As shown in FIG. 1A, rotary encoder 110 with radius $r_0$ can be mounted to rotate about a point at distance di 122 from geometry center 102 at phase angle $\phi_1$ 124. In some instances, eccentricity error 100A can generate errors that vary once per revolution.

In some examples, effective radius $r_e$, which is a radius of the rotation can be expressed as a function of an angle as below:

$$r_e(\theta) = r_0 + a_1\sin(\theta - \phi_1) \qquad (1)$$

where $r_e$ is the effective radius (i.e., the distance from the center of rotation to a point on the circumstance of the circle),
$r_0$ is the actual radius from the center of the encoder,
$a_1$ is the magnitude of the eccentricity,
$\theta$ is the angle from the nominal zero azimuth, and
$\phi_1$ is the angular offset of the axis of eccentricity from encoder zero.

In addition to eccentricity error 100A, which may be caused by an off-center mounting, tilt error 100B of rotary encoder 110 is illustrated in FIG. 1B where rotary encoder 110 may be mounted with a precession. In some examples, tilt error 100B can occur when geometric axis 130 of rotary encoder 110 is inclined to rotational axis 132 by an angle β 134. In some instances, tilt error 100B can generate errors that vary twice per revolution.

In some instances, the effect from an encoder precession can be identical to that of an elliptical encoder ring. The effective radius due to an elliptical encoder ring can be modeled as below:

$$r_e(\theta) = r_0 + a_3\sin(2\theta - \phi_2) \qquad (2)$$

where $r_e$ is the effective radius,
$r_0$ is the actual radius from the center of the encoder,
$a_3$ is half the magnitude of the difference of the major and semi-major axes of the ellipse,
$\theta$ is the angle from the nominal zero azimuth, and
$\phi_2$ is the angular offset of the major axis from encoder zero.

As illustrated in FIGS. 1A and 1B, both eccentricity error 100A and tilt error 100B of rotary encoder 110 may lead to a substantial impact on the accuracy of sensor data.

Figure 2:
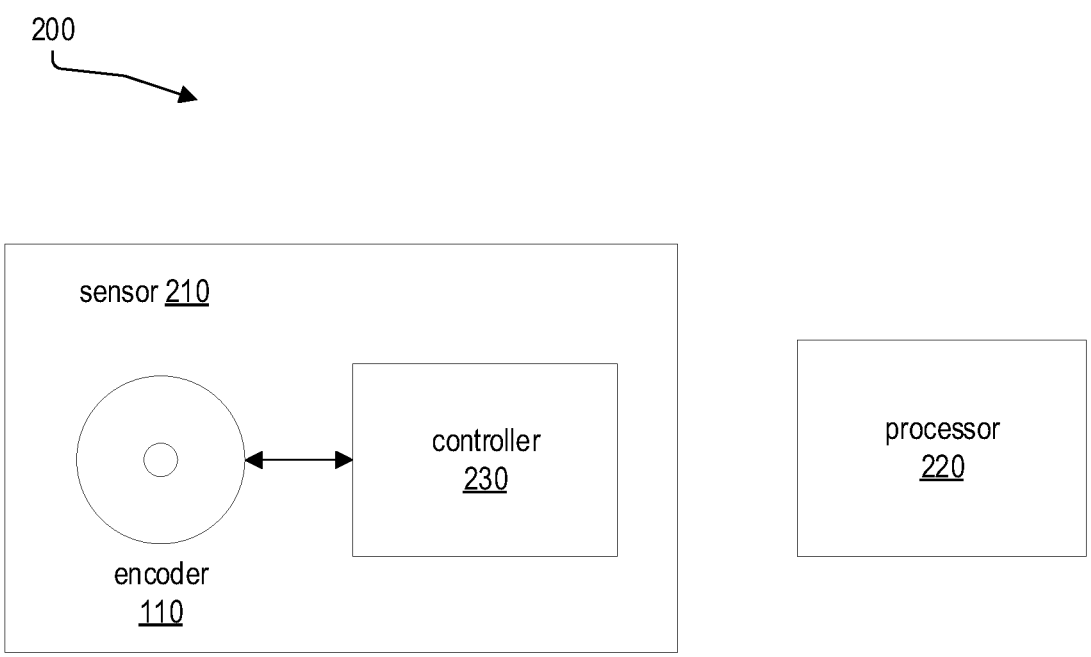
FIG. 2 illustrates an example rotary encoder calibration system according to some aspects of the disclosed technology.

FIG. 2 illustrates rotary encoder calibration system 200, which comprises sensor system 210 and processor 220. In some examples, sensor system 210 may include one or more sensors (not shown), encoder 110, and controller 230. In some examples, controller 230 is configured to receive sensor data, more specifically, measurement data from rotary encoder 110 such as positional data and/or angular data, which then can be used to provide output signals.

In some examples, processor 220 is configured to determine an angular velocity based on the measurement data. In some instances, processor 220 is further configured to determine any positioning error of the rotary encoder such as eccentricity error 100A and/or tilt error 100B.

In some instances, controller 230 can be connected to encoder 110. In some examples, controller 230 can be physically part of encoder 110 where controller 230 is embedded in a housing or in any suitable form.

Figure 3:
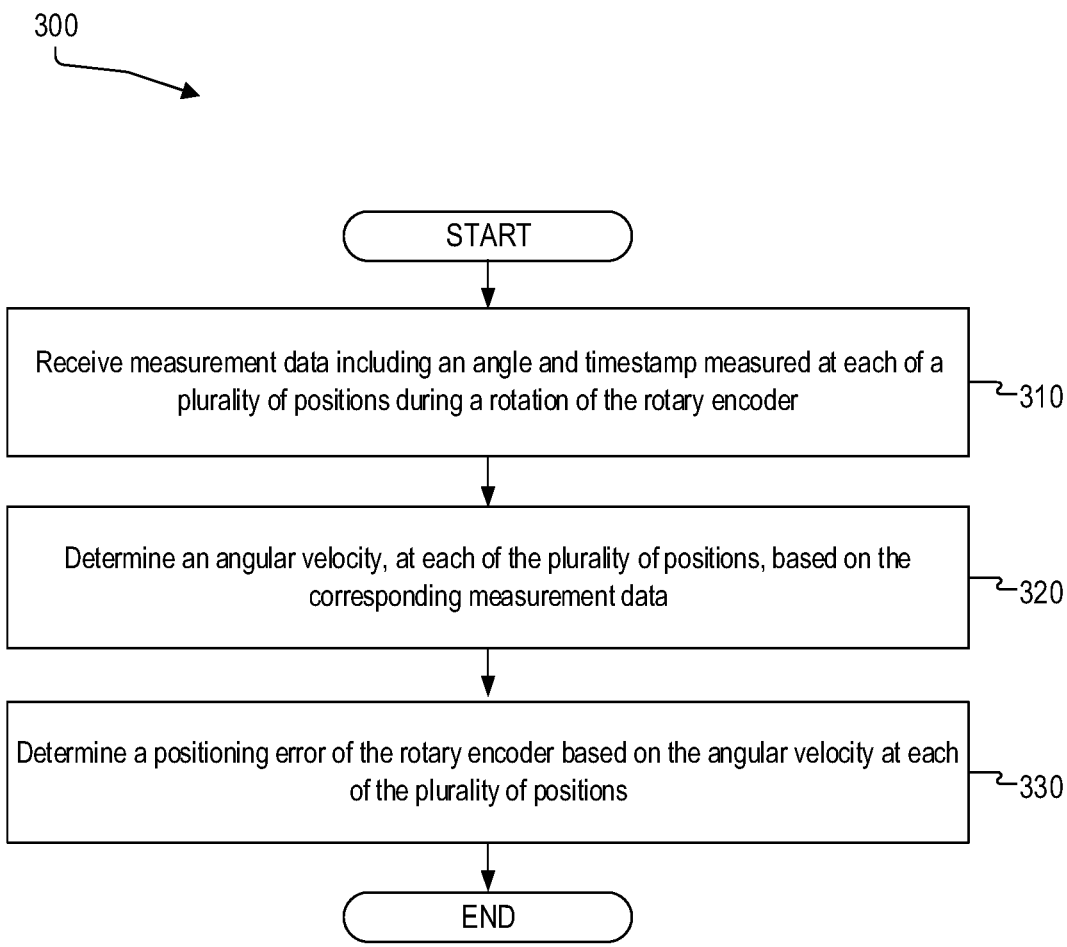
FIG. 3 is a flowchart of an example method for determining a positioning error of a rotary encoder according to some aspects of the disclosed technology.

FIG. 3 is a flowchart of an example method 300 for determining a curvature of a target for a sensor calibration according to some aspects of the disclosed technology. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements method 300 may perform functions at substantially the same time or in a specific sequence.

According to some examples, method 300 includes receiving measurement data including an angle and timestamp measured at each of a plurality of positions during a rotation of a rotary encoder at step 310. For example, controller 230 as illustrated in FIG. 2 can receive sensor data such as measurement data including an angle and timestamp measured at each of the plurality of positions during a rotation of rotary encoder 110 as illustrated in FIG. 2. As rotary encoder 110 rotates about an encoder axis, rotary encoder 110 may track the angular positioning of rotary encoder 110 and measure the angle and timestamp associated with the angle at each of the positions during the rotation. In some instances, rotary encoder 110 may send such measurement data to controller 230.

In some instances, the rotary encoder is assumed to rotate at a constant angular velocity since a rotor of the rotary encoder has a high angular momentum and a motor of the rotary encoder has relatively low torque.

In some examples, the angle and timestamp associated with the angle can be the sole input that is needed to determine the positioning error(s) such as eccentricity error 100A and/or tilt error 100B as illustrated in FIGS. 1A and 1B.

According to some examples, method 300 includes determining an angular velocity, at each of the plurality of positions, based on the corresponding measurement data at step 320. For example, processor 220 as illustrated in FIG. 2 may determine the angular velocity at each of the plurality of positions based on the corresponding measurement data.

In some instances, processor 220 as illustrated in FIG. 2 may numerically differentiate the angle and time (i.e., timestamp) to determine an angular velocity for each point of the rotary encoder during the rotation.

According to some examples, method 300 includes determining a positioning error of the rotary encoder based on the angular velocity at each of the plurality of positions at step 330. For example, processor 220 as illustrated in FIG. 2 may determine the positioning error of rotary encoder 110, for example, eccentricity error 100A and/or tilt error 100B as illustrated in FIGS. 1A and 1B, based on the angular velocity at each of the plurality of positions. In some examples, the rotation and frequency components are assumed to solely attribute to the positioning error(s) of the rotary encoder.

Eccentricity Error

In some examples, the rotary encoder is coupled to a lidar sensor. For example, the rotary encoder used in a lidar system can be an incremental rotary encoder with a zero-position mark set up to measure an angle. In this case, the azimuth angle can be calculated by counting ticks from the zero angle, which can be expressed as an arc length from the zero-position mark. In some instances, the measured azimuth angle for an eccentric rotary encoder (i.e., a rotary encoder that is mounted off-centered) can be expressed as below:

$$\theta_m(\theta_a) = \frac{1}{r_0} \int_0^{\theta_a} r_e(\theta) d\theta \quad (3)$$

where the subscript m denotes "measured" and the subscript a denotes "actual." The "measured" represents the values reported by the rotary encoder (e.g., rotary encoder 110 as illustrated in FIG. 2) and the "actual" represents the motion of the physical sensor system (e.g., lidar system) without including the eccentrically mounted rotary encoder.

When Equation (3) is substituted:

$$\theta_m(\theta_a) = \frac{1}{r_0} \int_0^{\theta_a} r_0 + a_1 \sin(\theta - \phi_1) d\theta \quad (4)$$

Equation (4) then can be broken into two components as below:

$$\theta_m(\theta_a) = \frac{1}{r_0} \int_0^{\theta_a} r_0 d\theta + \frac{1}{r_0} \int_0^{\theta_a} a_1 \sin(\theta - \phi_1) d\theta \quad (5)$$

$$\theta_m(\theta_a) = \int_0^{\theta_a} d\theta + \frac{1}{r_0} \int_0^{\theta_a} a_1 \sin(\theta - \phi_1) d\theta \quad (6)$$

$$\theta_m(\theta_a) = \theta_a + \frac{1}{r_0} \int_0^{\theta_a} a_1 \sin(\theta - \phi_1) d\theta \quad (7)$$

As shown in Equation (7), the measured azimuth angle $\theta_m$ is the actual azimuth angle $\theta_a$ plus a sinusoidal error term. Once the integral is evaluated, the eccentricity error can be modeled as a cosine function. In other words, the error in azimuth angle can be a phase shifted by $\pi/2$ from the axis of eccentricity.

In some examples, the measured azimuth angle $\theta_m$ can be represented as a function of the actual azimuth angle $\theta_a$ as below:

$$\theta_m(\theta_a) = \theta_a + a_2 \sin\left(\theta_a - \phi_1 - \frac{\prod}{2}\right) \quad (8)$$

The actual azimuth angle $\theta_a$ can be recreated if the two constants, $a_2$ and $\phi_1$ are known so that there is no need to recover $r_0$ or $a_1$ or find a relationship between $a_1$ and $a_2$.

According to some examples, a lidar does not provide any information on the radius or actual azimuth angle of the lidar. Instead, the only signals are a measured angle and time reported by the lidar, which may appear as a use case for a Fast Fourier Transform (FFT). However, Hesai lidars can fire off of an azimuth trigger, which can result in unevenly sampled data. In some instances, a portion of the lidar field of view (FOV) may not be used and does not provide any data. The resulting discontinuous, unevenly sampled signal can be difficult to evaluate.

In some examples, directly fitting a sinusoidal function to the signal based on the azimuth angle and time can be also difficult since the data includes noise. Using a large amount of data can be tricky since lower frequency variations in the angular velocity of the lidar system will effectively shift the phase of the signal over time.

In some instances, since the angular velocity of the lidar is a derivative of the azimuth angle, the eccentricity error should also be captured in the angular velocity signal. Numerical differentiation of the signal, plotting the angular velocity against the azimuth angle, and fitting the data can provide clear signal information.

In some examples, the eccentricity error is sinusoidal with a period of $2\Pi$. Fitting a sine curve with a fixed frequency of $2\Pi$ can yield three values:

$$f(x) = A + B \sin(x + C) \quad (9)$$

Given the input of time and angular velocity, A denotes the average angular velocity, B denotes the amplitude of the variation in angular velocity, and C denotes the phase offset of the angular velocity error relative to the encoder zero angle.

ASSUMPTION #1: The angular velocity of the lidar system is constant and the lidar system is linear time-invariant.

In some examples, the eccentricity error must be isolated from other signals such as fluctuations in the angular velocity of the physical system. The moment of inertia of the lidar rotor can be large (e.g., rotor spinning at over 600 rpm) relative to the maximum torque of the motor and changes to rpm due to the control system running slower than the 10 Hz frequency of the encoder eccentricity. This assumption can be determined by verifying the time constant of the system. The larger the moment of inertia and/or the speed of the rotor, the less the degree of the eccentricity error and the higher the accuracy of the sensor data.

Additionally, the angular velocity noise introduced by an unstable control system may not occur consistently at the same phase offset relative to the zero encoder position between multiple power cycles.

Given ASSUMPTION #1, the azimuth angle can be represented as:

$$\theta_a(t) = \omega_a t + \phi_{r0} \quad (10)$$

where $\omega_a$ is the angular velocity of the lidar rotor expressed in rad/s and $\phi_{r0}$ is the azimuth angle of the rotor at time zero. The final encoder azimuth compensation function is not dependent on time, only on the azimuth angle.

By examining the following case where at $t_0$ the encoder is at zero azimuth mark on the encoder, the equation can be simplified as below:

$$\theta_a(t_0) = \phi_{r0} = 0 \quad (11)$$

Now with:

$$\theta_a(t) = \omega_a t \quad (12)$$

In some examples, based on the assumption that the angular velocity is constant, there can be a one-to-one mapping between $\theta_a$ and t in a single period. Since the encoder reports the azimuth angle on the domain [0, 360), and the signal is periodic with a period of 2Π, examining $\theta_m(\theta_a)$ in the domain [0, 2Π) and $\theta_m(t)$ in the domain [0, T) can be sufficient to completely capture the behavior of the physical system. For example, for every t, there is a corresponding $\theta_a$ and $\theta_m$.

$$\theta_m(\theta_a) = \theta_a + a_2 \sin\left(\theta_a - \phi_1 - \frac{\Pi}{2}\right) \quad (13)$$

In some instances, the model of the encoder noise based on Equation (8) can also be expressed with respect to time instead of azimuth angle by changing the independent variable from $\theta_a$ to t:

$$\theta_m(\theta_a(t)) = \theta_a(t) + a_2 \sin\left(\theta_a(t) - \phi_1 - \frac{\Pi}{2}\right) \quad (14)$$

By changing the domain from [0, 2Π) to [0, T), since $\omega_a = 2\Pi f$ and $T=1/f$, Equation (14) can be represented as:

$$\theta_m(t) = \theta_a(t) + a_2 \sin\left(\theta_a(t) - \phi_1 - \frac{\Pi}{2}\right) \quad (15)$$

In some examples, the speed error can be computed by taking a derivative as shown below:

$$\omega_m(t) = \frac{d}{dt}\theta_m(t) = \frac{d}{dt}\theta_a(t) + \frac{d}{dt}\theta_a(t) a_2 \cos\left(\theta_a(t) - \phi_1 - \frac{\Pi}{2}\right) \quad (16)$$

Using ASSUMPTION #1 again, where angular velocity is constant:

$$\frac{d}{dt}\theta_a(t) = \omega_a \quad (17)$$

Substituting back in:

$$\omega_m(t) = \omega_a + \omega_a a_2 \cos\left(\theta_a(t) - \phi_1 - \frac{17}{2}\right) \quad (18)$$

With $\omega_m$ expressed as a function of time, $\theta_a/\omega_a$ can be substituted for t. Also, the domain can be changed back from [0, T) to [0, 2Π) by relying on the one to one correspondence between time and azimuth angle within a single period:

$$\omega_m\left(\frac{\theta_a}{\omega_a}\right) = \omega_a + \omega_a a_2 \cos\left(\theta_a - \phi_1 - \frac{\pi}{2}\right) \quad (19)$$

$$\omega_m(\theta_a) = \omega_a + \omega_a a_2 \cos\left(\theta_a - \phi_1 - \frac{\pi}{2}\right) \quad (20)$$

Converting Equation (2) into a sine function:

$$\omega_m(\theta_a) = \omega_a + \omega_a a_2 \sin(\theta_a - \phi_1) \quad (21)$$

The sine function as shown in Equation (21) can be recovered from the data, which is output from the lidar system. If the following sinusoid is fit to the data:

$$\omega_m(\theta_a) = A + B \sin(\theta_a + C) \quad (22)$$

where the constants $\omega_a$, a and $\phi_1$ can be recovered as:

$$\omega_a = A$$

$$a_2 = \frac{B}{A}$$

$$\phi_1 = C$$

Based on Equation (8):

$$\theta_m(\theta_a) = \theta_a + a_2 \sin\left(\theta_a - \phi_1 - \frac{\pi}{2}\right) \quad (23)$$

Using the recovered parameters:

$$\theta_m(\theta_a) = \theta_a + \frac{B}{A}\sin\left(\theta_a - C - \frac{\pi}{2}\right) \quad (24)$$

Rearranging Equation (24) yields the below:

$$\theta_a = \theta_m - \frac{B}{A}\sin\left(\theta_a - C - \frac{\pi}{2}\right) \quad (25)$$

ASSUMPTION #2: $\theta_a \approx \theta_m$ when $\theta$ is used as the independent variable.

In some examples, the magnitude of the azimuth error introduced by the rotary encoder can be small (typically less than 0.25 degrees). In order to remove the circular dependency, the measured and actual azimuth angles can be used interchangeably as the independent variable when it is necessary.

Using ASSUMPTION #2 and substituting $\theta_a = \theta_m$, the calibrated azimuth angle can be calculated as:

$$\theta_a = \theta_m - \frac{B}{A}\sin\left(\theta_m - C - \frac{\pi}{2}\right) \quad (26)$$

Tilt Error

Taking a derivative of Equation (2) yields the below:

$$\theta_m(\theta_a) = \theta_a + a_4 \sin\left(2\theta_a - \phi_2 - \frac{\pi}{2}\right) \quad (27)$$

$$\omega_m(\theta_a) = \omega_a + 2\omega_a a_4 \sin(2\theta_a - \phi_2) \quad (28)$$

where
$\alpha_4$ is the magnitude of the azimuth error caused by the tilt error (i.e., encoder precession).

Combining Eccentricity Error and Tilt Error Modes

Both eccentricity error and tilt error can be combined as:

$$r_e(\theta) = r_0 + a_1 \sin(\theta - \phi_1) + a_3 \sin(2\theta - \phi_2) \quad (29)$$

$$\omega_m(\theta_a) = \omega_a + \omega_a a_2 \sin(\theta_a - \phi_1) + 2\omega_a a_4 \sin(2\theta_a - \phi_2) \quad (30)$$

Fit the following function:

$$\omega_m(\theta_a) = A + B\sin(\theta_a + C) + D\sin(\theta_a + E) \quad (31)$$

where $$\omega_a = A$$

$$a_2 = \frac{B}{A}$$

$$\phi_1 = C$$

$$a_4 = \frac{D}{2A}$$

$$\phi_2 = E$$

Yielding the compensation function:

$$\theta_a = \theta_m - \frac{B}{A}\sin\left(\theta_m - C - \frac{\pi}{2}\right) - \frac{D}{2A}\sin\left(\theta_m - E - \frac{\pi}{2}\right) \quad (32)$$

Based on Equation (32), a positioning error including both eccentricity error and tilt error can be determined, which can indicate the improper setup of the physical system. For example, the eccentricity error can provide how off-centered the rotary encoder is and the tilt error can provide how tilted the rotary encoder is. As shown in Equation (32), the compensation function (i.e., calibration function) can be expressed as a combination of two sinusoidal functions. In some examples, based on the positioning error, a calibration can be performed to compensate for any manufacturing error and improve the accuracy of the sensor data.

Figure 4:
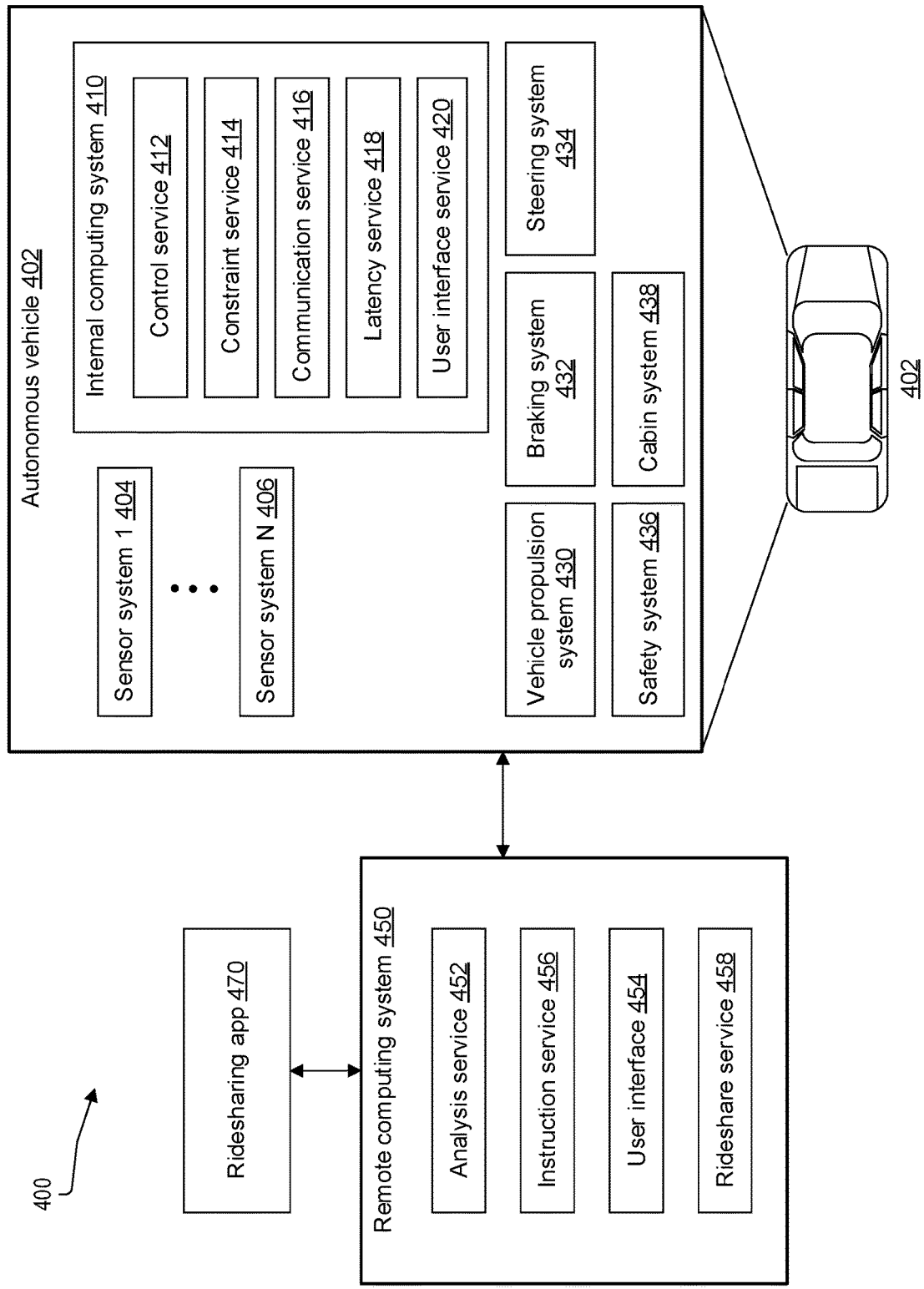
FIG. 4 illustrates an example AV environment including a computing system in communication with an AV, in accordance with some examples.

FIG. 4 illustrates environment 400 that includes an autonomous vehicle 402 in communication with a computing system 450.

The autonomous vehicle 402 can navigate about roadways without a human driver based upon sensor signals output by sensor systems 404-406 of the autonomous vehicle 402. The autonomous vehicle 402 includes a plurality of sensor systems 404-406 (a first sensor system 404 through an Nth sensor system 406). The sensor systems 404-406 are of different types and are arranged about the autonomous vehicle 402. For example, the first sensor system 404 may be a camera sensor system and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

The autonomous vehicle 402 further includes a safety system 436 that can include various lights and signal indicators, parking brake, airbags, etc. The autonomous vehicle 402 further includes a cabin system 438 that can include cabin temperature control systems, in-cabin entertainment systems, etc.

The autonomous vehicle 402 additionally comprises an internal computing system 410 that is in communication with the sensor systems 404-406 and the mechanical systems 430, 432, 434. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control operation of the vehicle propulsion system 430, the braking system 432, the steering system 434, the safety system 436, and the cabin system 438. The control service 412 receives sensor signals from the sensor systems 404-406 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 414 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 402 regarding reporting data for training and evaluating machine learning algorithms, requesting assistance from remoting computing system or a human operator via the remote computing system 450, software service updates, ridesharing pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

The remote computing system 450 can also include an instruction service 456 for sending instructions regarding the operation of the autonomous vehicle 402. For example, in response to an output of the analysis service 452 or user interface service 454, instruction service 456 can prepare instructions to one or more services of the autonomous vehicle 402 or a co-pilot or passenger of the autonomous vehicle 402.

The remote computing system 450 can also include a rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc.

Figure 5:
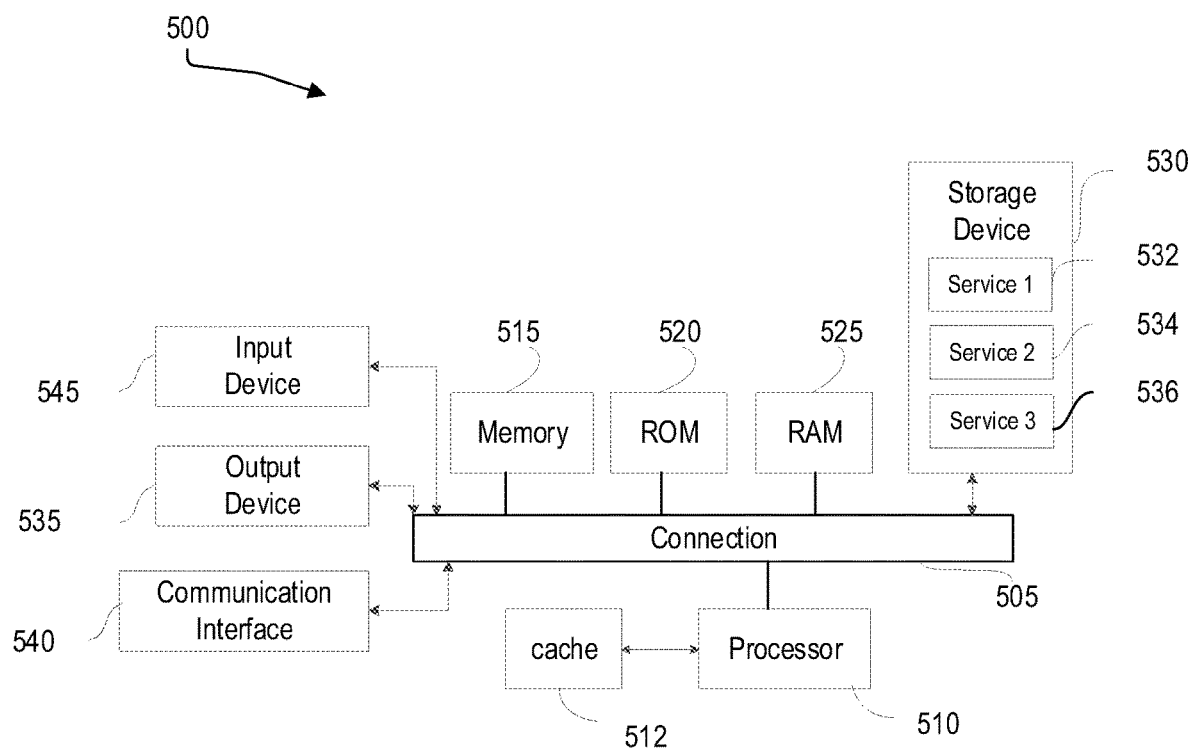
FIG. 5 shows an example of a computing system for implementing certain aspects of the present technology.

FIG. 5 shows an example of computing system 500, which can be for example any computing device making up rotary encoder calibration system 200 as illustrated in FIG. 2 or computing system 410 as illustrated in FIG. 4, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A control system comprising:
   a rotary encoder;
   one or more processors coupled to the rotary encoder; and
   a computer-readable medium comprising instructions stored therein, which when executed by the one or more processors, cause the one or more processors to:
   receive measurement data including an angle and timestamp measured at each of a plurality of positions during a rotation of the rotary encoder;
   determine an angular velocity, at each of the plurality of positions, based on the corresponding measurement data; and
   determine a positioning error of the rotary encoder, the positioning error comprising an eccentricity error caused by an off-centered positioning of the rotary encoder and a tilt error caused by a tilt of the rotary encoder, wherein determining the positioning error comprises calculating the eccentricity error and the tilt error using a combination of two sinusoidal calibration functions based on the angular velocity at each of the plurality of positions.

2. The control system of claim 1, wherein the positioning error of the rotary encoder determined at each of the plurality of positions is calculated using a sinusoidal calibration function of the two sinusoidal calibration functions.

3. The control system of claim 1, wherein the positioning error is further based on a radius of the rotation from a center of the rotary encoder.

4. The control system of claim 1, wherein the rotary encoder rotates at a constant angular velocity.

5. The control system of claim 1, wherein the rotary encoder is coupled to a Light Detection and Ranging (LiDAR) sensor.

6. A method comprising:
   receiving measurement data including an angle and timestamp measured at each of a plurality of positions during a rotation of a rotary encoder;
   determining an angular velocity, at each of the plurality of positions, based on the corresponding measurement data; and
   determining a positioning error of the rotary encoder, the positioning error comprising an eccentricity error caused by an off-centered positioning of the rotary encoder and a tilt error caused by a tilt of the rotary encoder, wherein determining the positioning error comprises calculating the eccentricity error and the tilt error using a combination of two sinusoidal calibration functions based on the angular velocity at each of the plurality of positions.

7. The method of claim 6, wherein the positioning error of the rotary encoder determined at each of the plurality of positions is calculated using a sinusoidal calibration function of the two sinusoidal calibration functions.

8. The method of claim 6, wherein the positioning error is further based on a radius of the rotation from a center of the rotary encoder.

9. The method of claim 6, wherein the rotary encoder rotates at a constant angular velocity.

10. The method of claim 6, wherein the rotary encoder is coupled to a Light Detection and Ranging (LiDAR) sensor.

11. A non-transitory computer-readable storage medium comprising computer-readable instructions, which when executed by a computing system, cause the computing system to:
    receive measurement data including an angle and timestamp measured at each of a plurality of positions during a rotation of a rotary encoder;
    determine an angular velocity, at each of the plurality of positions, based on the corresponding measurement data; and
    determine a positioning error of the rotary encoder, the positioning error comprising an eccentricity error caused by an off-centered positioning of the rotary encoder and a tilt error caused by a tilt of the rotary encoder, wherein determining the positioning error comprises calculating the eccentricity error and the tilt error using a combination of two sinusoidal calibration functions based on the angular velocity at each of the plurality of positions.

12. The non-transitory computer-readable storage medium of claim 11, wherein the positioning error of the rotary encoder determined at each of the plurality of positions is calculated using a sinusoidal calibration function of the two sinusoidal calibration functions.

13. The non-transitory computer-readable storage medium of claim 11, wherein the positioning error is further based on a radius of the rotation from a center of the rotary encoder.

14. The non-transitory computer-readable storage medium of claim 11, wherein the rotary encoder rotates at a constant angular velocity.

* * * * *